(No Model.)
F. G. DRAPER.
COMBINED HINGE AND ADJUSTABLE CLAMP.
No. 453,627. Patented June 9, 1891.
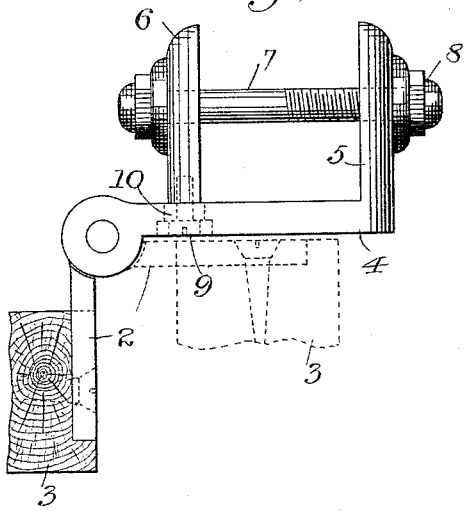
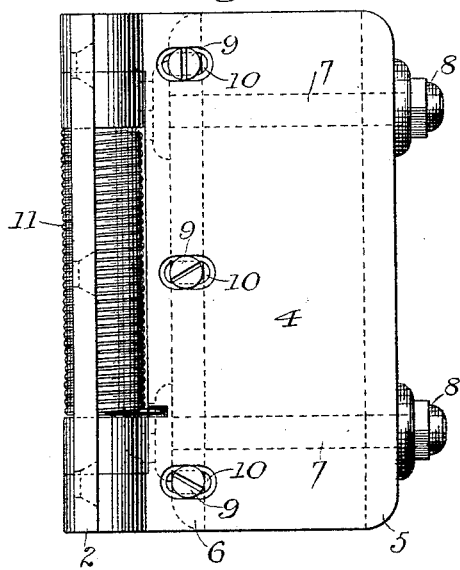 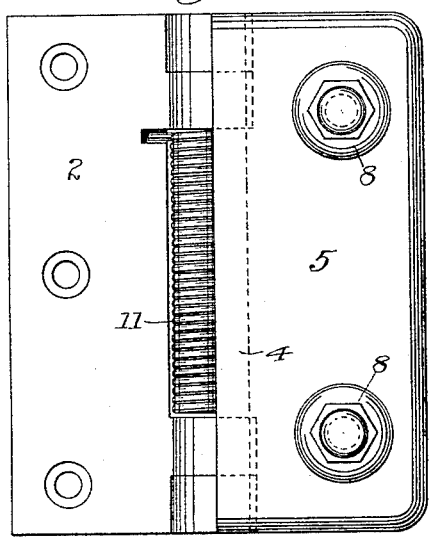
Witnesses:—
C. L. Caldwell.
A. Max Walch
Inventor:—
Frederick G. Draper,
per Paul A. Merwin
Attorneys.

UNITED STATES PATENT OFFICE.

FREDERICK G. DRAPER, OF ST. PAUL, MINNESOTA.

COMBINED HINGE AND ADJUSTABLE CLAMP.

SPECIFICATION forming part of Letters Patent No. 453,627, dated June 9, 1891.

Application filed December 2, 1890. Serial No. 373,304. (No model.)

*To all whom it may concern:*

Be it known that I, FREDERICK G. DRAPER, of St. Paul, Ramsey county, Minnesota, have invented certain Improvements in Combined Adjustable Clamps and Door-Hinges, of which the following is a specification.

My invention relates to improvements in door-hinges designed to be secured to and supported upon marble slabs, such as are used for partitions in toilet-rooms in public and office buildings, its object being to provide a clamp which is adjustable to varying thicknesses of slabs and adapted to be firmly secured thereto without the necessity of cutting down the slab or filling it out to the required thickness to fit the clamp.

To this end my invention consists in forming one flap of the hinge with a right-angled bend or lip forming one member of the clamp and securing the other clamp member upon the hinge-flap adjustably to and from the other clamp member.

My invention further consists in the construction and combination hereinafter described, and particularly pointed out in the claims.

In the accompanying drawings, forming part of this specification, Figure 1 is an end view of my improved combined clamp and hinge; Fig. 2, a plan view of the clamp-flap of a hinge; and Fig. 3 is a plan view of the side of the clamp.

In the drawings, 2 represents the flap of the hinge to be attached to the edge of the door 3 in the ordinary manner.

4 is the other flap of the hinge, having an extension integral therewith forming the member 5 of the clamp, preferably at right angles with the plane of the flap, the flap thus forming a bar or plate to bear upon the edge of the slab when the clamp is in position.

6 is the adjustable member of the clamp, which is gripped upon the slab by means of bolts 7, passed through the slab and the two members and secured by means of nuts 8, threaded upon the same. The member 6 is secured in adjusted positions upon the flap 4 by means of machine-screws 9, passed through slotted openings 10 in the flap and threaded into the abutting edge of the clamp member. A spiral spring 11, surrounding the pintle of the hinge in the common manner, serves to make it automatic in opening. The dotted lines in Fig. 1 show the position when the door is closed; the full lines when open.

In fitting the clamp to a slab the bolts 7 are removed and the screws 9 loosened to permit the adjusting of the member 6. The clamp is then slipped upon the edge of the slab and the bolts 7 inserted through holes in the slab and the nuts 8 screwed on, so as to bring the members 5 and 6 into rigid position on the opposite sides of the slab. The member 6 is free to move upon the flap 4 to adapt itself to the thickness of the slab, the screws 9 moving in the slots 10 as carried by the member 6. After the tightening of the nuts 8 the screws 9 are also tightened, and the clamp and hinge are thereby made rigid upon the slab.

I claim—

1. In a hinge, the combination, with one of the flaps, of laterally-extending clamp members upon said flap, one rigidly secured thereto and the other adjustable along the same, substantially as described.

2. In a device of the class described, an adjustable clamp comprising, in combination, a plate adapted to bear upon the edge of the slab, a clamp member formed integral and at right angles with the same adapted to bear upon the side of the slab, a clamp member parallel with the first, means for securing said clamp members upon the opposite sides of the slab, and means for securing the second clamp member to said plate in adjusted positions to and from the first member, substantially as described.

3. The combination of the plate 4, the clamp member 5, formed integral and at right angles therewith, the clamp member 6, the slots 10 in the plate 4, and the screws 9, arranged in said slots and secured in the abutting edge of the clamp member 6, substantially as and for the purposes set forth.

In testimony whereof I have hereunto set my hand this 26th day of November, 1890.

FREDERICK G. DRAPER.

In presence of—
T. D. MERWIN,
A. MAE WELCH.